March 14, 1961
O. WITTEL
2,974,578
MANUAL ADJUSTMENT OF AUTOMATIC EXPOSURE
CONTROL FOR PHOTOGRAPHIC CAMERAS
Filed April 29, 1959
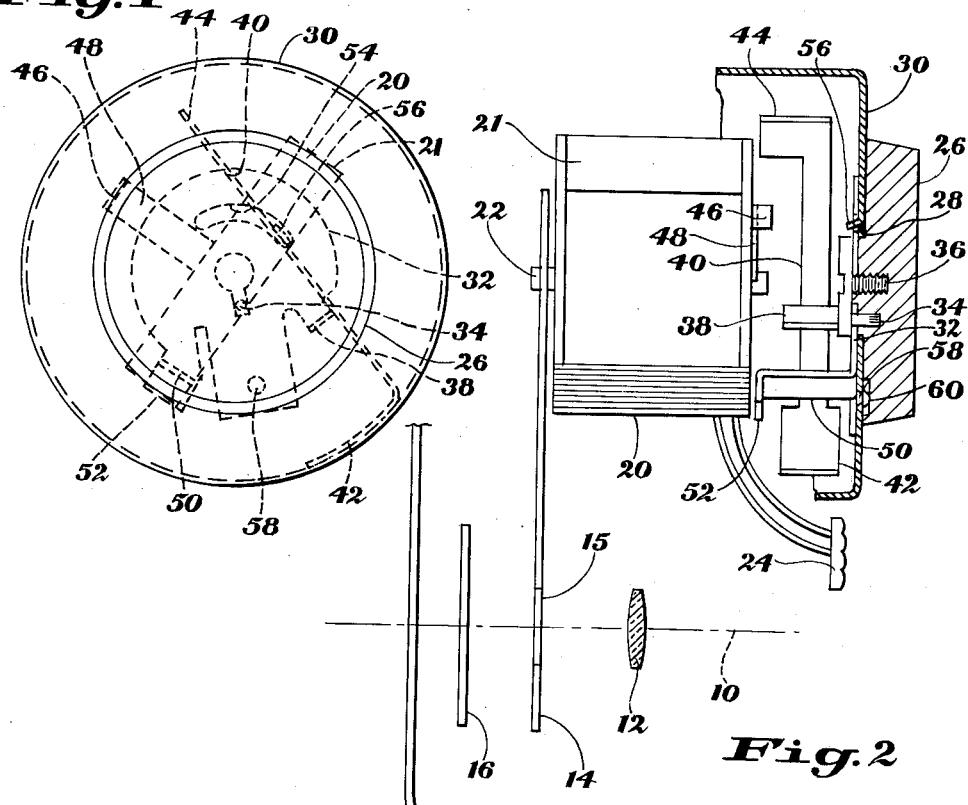
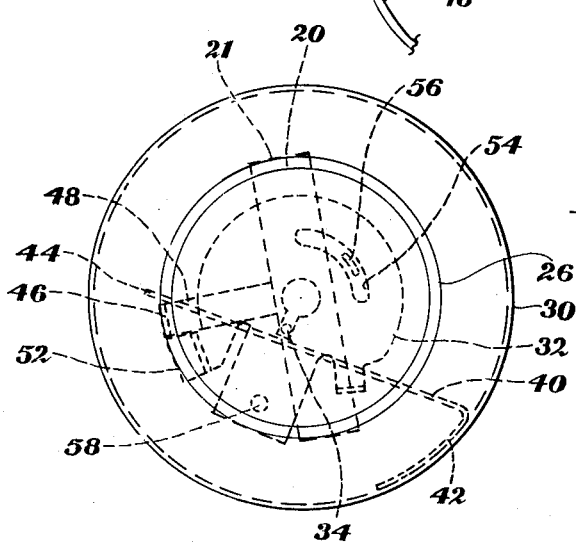
Otto Wittel
INVENTOR.
BY
ATTORNEYS

United States Patent Office 2,974,578
Patented Mar. 14, 1961

2,974,578

MANUAL ADJUSTMENT OF AUTOMATIC EXPOSURE CONTROL FOR PHOTOGRAPHIC CAMERAS

Otto Wittel, Rochester, N.Y., assignor to Eastman Kodak Company, Rochester, N.Y., a corporation of New Jersey Filed Apr. 29, 1959, Ser. No. 809,653

4 Claims. (Cl. 95—64)

The present invention relates to photographic cameras having automatic exposure control systems and more particularly concerns devices for manually overriding the automatic control of the exposure systems in such cameras.

Many photographic cameras are provided with means for automatically regulating the exposure of films as a function of the intensity of light from the scene or object that is to be photographed. The exposure can be regulated by controlling either the size of the exposure aperture or the shutter speed or both. An automatic exposure control system customarily includes a photoelectric cell which drives an electric measuring instrument such as a pivoted-coil galvanometer. The combination of cell and galvanometer constitutes a device which may be referred to broadly as an exposure meter, in which the pivoted coil constitutes a mechanical output member whose position is a function of the scene brightness. Instead of a galvanometer, the exposure meter may comprise a hot-wire actuator, a solenoid or other device having a mechanical output member which can be positioned as a function of the amplitude of an electric input signal from the photoelectric cell.

A camera that is equipped with an automatic exposure control system ordinarily requires no manual setting of the exposure factors. However, in situations where there is unusual back-lighting of the subject, or if for any other reason a deliberate overexposure or underexposure is desired, it is convenient to provide manually operable means for overriding the automatic system and manually setting the diaphragm aperture or the shutter speed or both.

In one manual override device of the prior art the circuit comprising the photoelectric cell and the instrument has been opened or shorted to return the instrument coil to a zero position corresponding, for example, to maximum diaphragm aperture. Then, a manually movable member rotates the instrument coil to any desired position. This form of manual override device requires the presence of an electric switch in a circuit of very low power and becomes inoperative quite easily if the switch contacts become oxidized or soiled. A second form of manual override device known in the art avoids the use of a switch in the exposure meter circuit and has a pair of manually movable bracketing members which cooperate with the instrument coil to move it in either direction under direct manual control, but which normally lie outside of the range of automatic coil movement. This form of manual override device is undesirable because it does not firmly hold the instrument coil in any manually set position; physical shock or a change in the energization of the electrical system can move the coil away from its manually set position.

It is therefore a primary object of the present invention to manually adjust the automatic exposure control system of a camera to any desired setting without disconnecting or shorting any of the electrical circuit of the control system, yet firmly holding the system in its desired setting. This object is accomplished by manually moving two abutment members toward each other and into engagement with a third member integral with the instrument coil, then moving both abutment members in the same direction for setting the coil at any desired position.

A more general object of the invention is to provide an improved manual override device which is rugged and relatively inexpensive.

Other objects of the invention will appear from the following description, reference being made to the accompanying drawings wherein:

Fig. 1 is a front view of the manual override mechanism when it is adjusted to permit automatic exposure regulation;

Fig. 2 is a side view of the mechanism shown in Fig. 1, also showing in schematic form the camera apparatus on the axis of the taking lens; and Fig. 3 is a front view of the manual override mechanism when it is adjusted for manual setting of the exposure control system.

Referring to Fig. 2, a typical camera embodying the present invention has a lens axis 10 with which are aligned a lens system, indicated generally at 12, the aperture 15 of a diaphragm vane 14, a shutter 16 and a photosensitive surface such as a film strip 18. The diaphragm vane 14 is secured to a frame 21 which supports the moving coil 20 of an electric measuring instrument. The coil is connected to a photoelectric cell 24 that is positioned to be illuminated by light from the scene or object which is to be photographed. In a manner well known in the art, coil 20 and its frame 21 are pivoted about an axis 22 to various positions corresponding to the intensity of the scene lighting. The diaphragm vane 14 or other exposure regulating member pivots with frame 21 and, in the case of a diaphragm vane, adjusts the size of the exposure aperture as a function of scene brightness. A single-vane diaphragm of the type illustrated in Fig. 2 is shown in detail in U.S. Patent No. 2,163,737.

A manual knob 26 is mounted centrally over an aperture 28 in a housing 30 of the camera and is adapted to be rotated relative to that housing. A plate 32 is locked to knob 26 by a pin 34 for rotation with the knob and is secured to the knob by a threaded screw 36. A first arm 38 extending inwardly from plate 32 toward the coil frame 21 cooperates with a leaf spring 40, one end of which is secured at 42 to the inner surface of the housing 30, as shown best in Fig. 1. The free end 44 of spring 40 is adapted to cooperate with an ear 46 of a member 48, which is secured to the front surface of the coil frame 21. When the camera is adjusted for automatic exposure control, arm 38 holds the free end 44 of spring 40 out of engagement with ear 46, as shown in Figs. 1 and 2.

A second arm 50 extends inwardly from plate 32 and has a foot 52 adapted to cooperate with ear 46 of member 48. When the override mechanism is in the position shown in Fig. 1 foot 52 (as well as spring end 44) lies outside the arcuate path of ear 46 and the instrument coil is free to rotate throughout its full range of operation in response to electrical energization by cell 24.

In order to manually override the automatic operation of the instrument and thereby to manually set the diaphragm vane 14 to any desired position, knob 26 is rotated clockwise from its position shown in Fig. 1 toward the position shown in Fig. 3, thereby carrying plate 32 and its arms 38 and 50 clockwise. During the first phase of such clockwise rotation, the movement of ear 38 permits the free end 44 of leaf spring 40 to move into engagement with the clockwise side of ear 46 and then to move that ear, the coil frame 21 and coil 20 counterclockwise to a predetermined position, which may correspond for example to maximum diaphragm aperture. At this position of knob 26, the foot 52 of arm 50 engages the counterclockwise side of ear 46, so that the foot 52 and the spring tip 44 are in clamping engagement with ear 46. Further clockwise rotation of knob 26 causes the foot 52 of arm 50 to move both the coil frame and spring tip 44 clockwise, away from arm 38, to any desired position of the coil frame and diaphragm vane.

In order to limit the angular movement of knob 26, an ear 56 on housing 30 extends inwardly through an arcuate slot 54 in plate 32 and permits that plate to move only through the angle subtended by the slot. Co-operating detents 58 and 60 in plate 32 and housing 30, respectively, may be provided for yieldably retaining the plate and therefore knob 26 in their initial positions corresponding to automatic exposure control.

The invention has been described in detail with particular reference to preferred embodiments thereof, but it will be understood that variations and modifications can be effected within the spirit and scope of the invention as described hereinabove and as defined in the appended claims. It is particularly understood that the manual override system may be employed in conjunction with an exposure control system wherein the shutter speed rather than the diaphragm opening is adjusted automatically. For this purpose, the diaphragm vane 14 of Fig. 2 may be replaced by a shutter speed ring or by mechanism connected to the shutter speed ring.

I claim:

1. In a photographic camera having means for focusing an image of a viewed scene onto a photosensitive surface; an exposure meter having a photocell disposed for illumination by light from said scene and having a pivoted coil energized by said photocell for movement within a predetermined effective angular range as a function of the brightness of said scene; a diaphragm mechanism coupled to said coil and adjusted by movement of said coil for automatically regulating the admission of scene light to said photosensitive surface as a function of said brightness; and means for manually adjusting said diaphragm mechanism, comprising: a first abutment member connected to said coil and having a range of movement corresponding to the angular range of said coil; second and third abutment members in bracketing relation to said first abutment member and normally lying outside the range of the first abutment member; a manually movable control device normally occupying a first position; means operated by said control device, in response to initial movement of the latter away from said first position, for moving at least one of said second and third abutment members toward the other for causing a clamping engagement of said second and third abutment members with said first abutment member; and means operated by said control device, in response to additional movement of the latter away from said first position, for moving both of said second and third abutment members in one direction, thereby to move said first abutment member and said coil in said one direction for adjusting said diaphragm mechanism as a function of the position of said control device while said coil remains energized by said photocell.

2. The adjusting means defined in claim 1, wherein said control member comprises a rotatable knob; the first abutment member comprises an ear rigidly secured to said coil; the second abutment member comprises an arm integral with said knob; and the third abutment member comprises a leaf spring held out of engagement with said ear under control of said knob when the latter is in a first angular position and permitted to engage said ear when said knob is rotated to a second angular position.

3. In a photographic camera having means for focusing an image of a viewed scene onto a photosensitive surface; an exposure meter having a photocell disposed for illumination by light from said scene and having a mechanical output member energized by said photocell for movement within a predetermined range as a function of the brightness of said scene; means controlled by said output member for automatically regulating the admission of scene light to said photosensitive surface as a function of said brightness; and means for manually regulating admission of scene light to said surface, comprising: a driven member integral with the mechanical output member of said meter and having a range of movement corresponding to the range of said output member; a pair of driving members in bracketing relation to said driven member and normally lying outside the range of said driven member; a manually movable control member; and means interrelating said control member and said driving members operable, in response to a manual movement of said control member in a predetermined direction, first for moving at least one of said driving members toward the other, thereby closely confining said driven member between said driving members and then for moving both of said driving members in one direction, thereby to selectively adjust the positions of said driven member and said output member for regulating the admission of scene light to said photosensitive surface as a function of the position of said control member while said output member remains energized by said photocell.

4. The regulating means defined in claim 3, wherein said control member comprises a knob, a first one of said driving members comprises a first arm integral with said knob, the second of said driving members comprises a spring member, and said interrelating means comprises a second arm integral with said knob and cooperating with said spring member to hold the latter out of engagement with said driven member when said knob is in a first position and to permit said spring member to engage said driven member when said knob is moved to a second position.

References Cited in the file of this patent

UNITED STATES PATENTS

| | | |
|---|---|---|
| 2,838,985 | Burger et al. | June 17, 1958 |
| 2,841,064 | Bagby et al. | July 1, 1958 |